United States Patent
Schultz et al.

(10) Patent No.: US 8,286,701 B2
(45) Date of Patent: Oct. 16, 2012

(54) RECOVERING HEATED FLUID USING WELL EQUIPMENT

(75) Inventors: Roger L. Schultz, Ninnekah, OK (US); Travis W. Cavender, Angleton, TX (US); Robert L. Pipkin, Marlow, OK (US); David J. Steele, Arlington, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 478 days.

(21) Appl. No.: 12/347,793

(22) Filed: Dec. 31, 2008

(65) Prior Publication Data

US 2010/0163250 A1 Jul. 1, 2010

(51) Int. Cl.
*E21B 17/00* (2006.01)
*E21B 17/07* (2006.01)
*E21B 17/02* (2006.01)

(52) U.S. Cl. .................. 166/242.6; 166/242.7; 166/381
(58) Field of Classification Search .................. 166/381, 166/242.6, 242.7; 285/187, 298, 41, 303
See application file for complete search history.

(56) References Cited

U.S. PATENT DOCUMENTS

| | | | |
|---|---|---|---|
| 1,476,657 A | 12/1923 | Tawney | |
| 2,900,213 A | 8/1959 | Bruce | |
| 3,463,252 A | 8/1969 | Miller et al. | |
| 3,585,803 A * | 6/1971 | Bardgette | 405/251 |
| 4,171,832 A * | 10/1979 | Metcalfe | 285/41 |
| 4,178,045 A * | 12/1979 | Neilson | 384/94 |
| 4,278,277 A * | 7/1981 | Krijgsman | 285/93 |
| 4,423,889 A | 1/1984 | Weise | |
| 4,601,338 A * | 7/1986 | Prats et al. | 166/278 |
| 4,640,354 A * | 2/1987 | Boisson | 166/250.01 |
| 4,759,554 A * | 7/1988 | Kemp et al. | 277/362 |
| 5,009,264 A | 4/1991 | Sliger et al. | |
| 5,358,054 A * | 10/1994 | Bert | 166/386 |
| 5,803,178 A | 9/1998 | Cain | |
| 2006/0219413 A1 | 10/2006 | Vilela et al. | |

FOREIGN PATENT DOCUMENTS

GB 1 338 189 A 11/1973
WO 2009/143300 A2 11/2009

OTHER PUBLICATIONS

*Oil, Gas & Geothermal-Production Wells: Geothermal Production Wells*, State of California Department of Conservation, http://www.conservation.ca/gov/dog/geothermal/general_info/Pages/prod, image dated Dec. 17, 2008, copyright 2007, 2 pages.
*Oil shale extraction*, Wikipedia, http://en.wikipedia.org/wiki/Oil_shale_extraction, image dated Dec. 17, 2008, 8 pages.
*Gapless Rings*, Total Seal, http://www.totalseal.com/html/rings/gapless/index.htm, at least as early as Aug. 25, 2006, 2 pages.
Invitation to Pay Additional Fees and Partial, mailed Sep. 3, 2010 for PCT/US2009/068987, 5 pages.
International Search Report and Written Opinion mailed Oct. 29, 2010 for PCT/US2009/068987, 16 pages.

* cited by examiner

*Primary Examiner* — Cathleen Hutchins
(74) *Attorney, Agent, or Firm* — Fish & Richardson P.C.

(57) ABSTRACT

A device has a first elongate tubular body and a second elongate tubular body coupled to the first tubular body, both adapted to reside in the wellbore. The device is changeable between the first tubular body axially fixed against movement in a first direction relative to the second tubular body and axially moveable in the first direction relative to the second elongate tubular body in response to temperature.

12 Claims, 10 Drawing Sheets

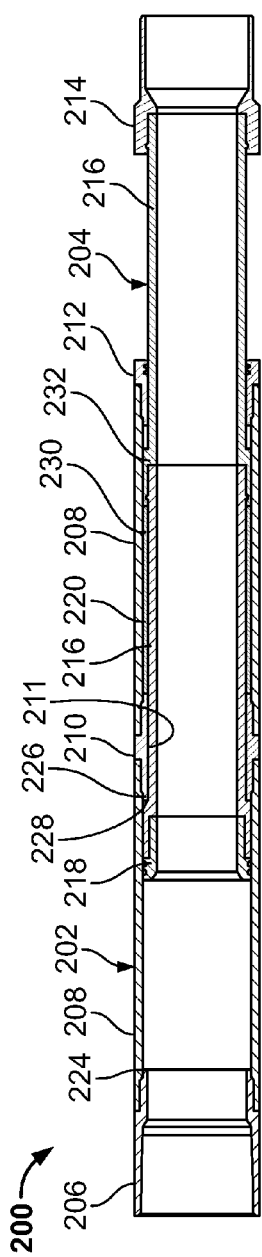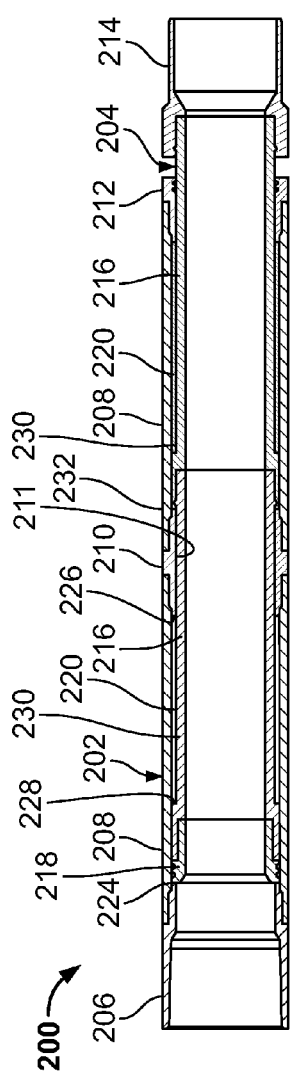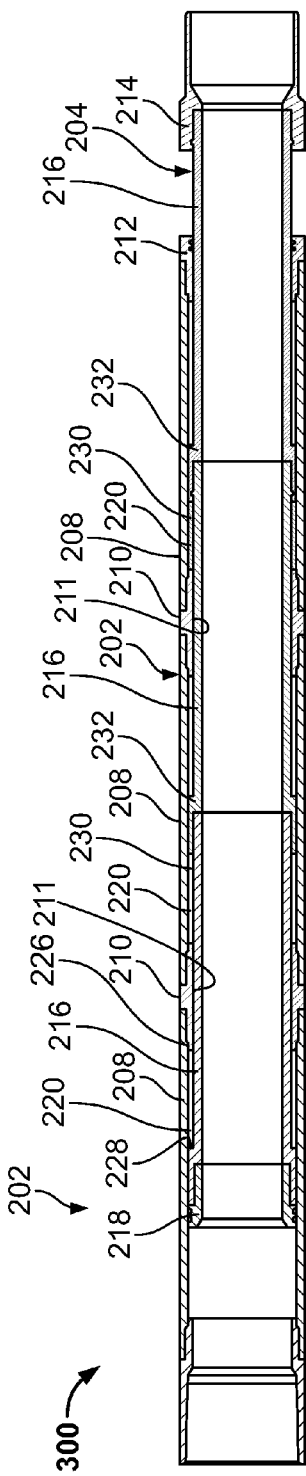

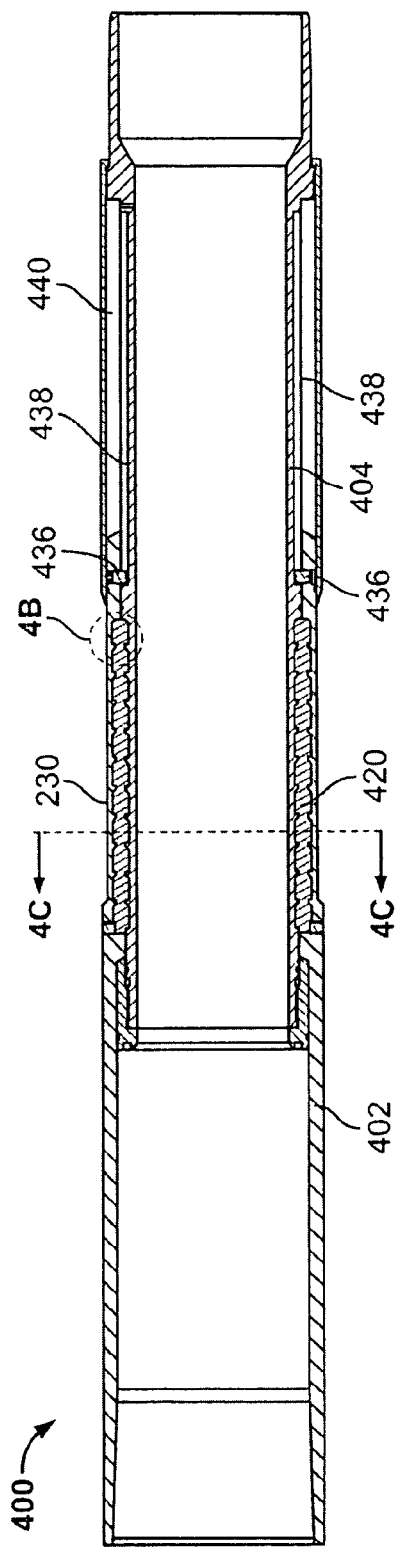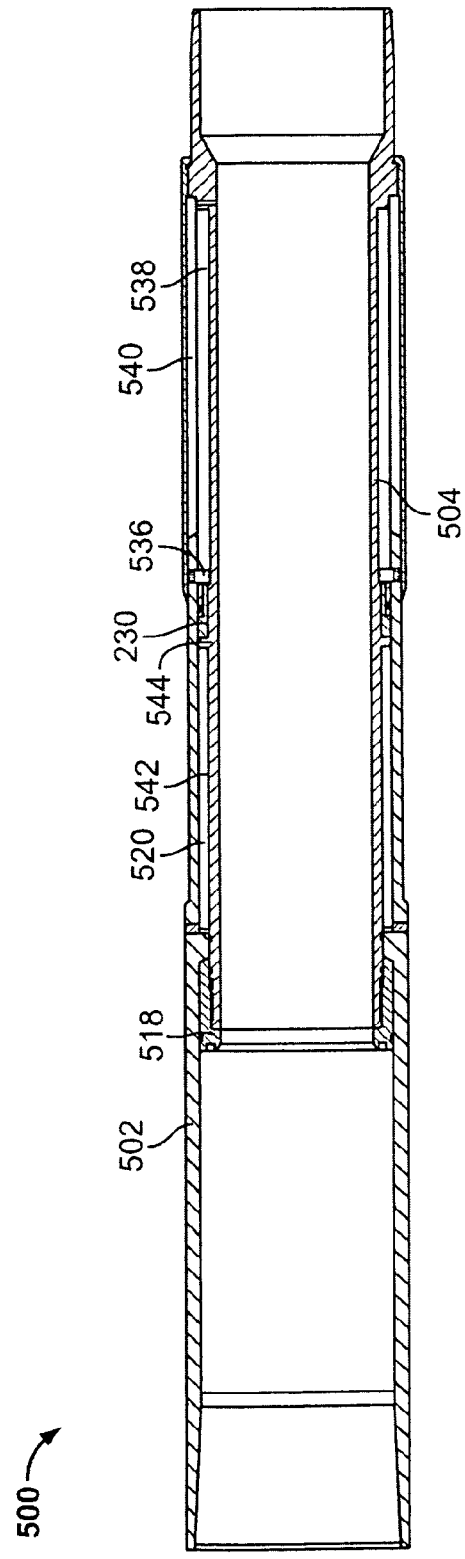
FIG. 4A
FIG. 5

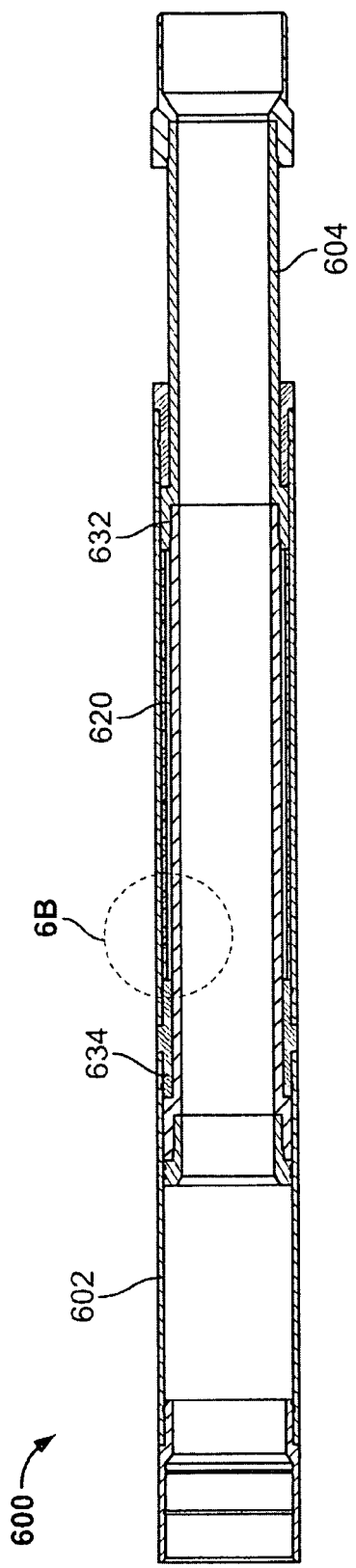
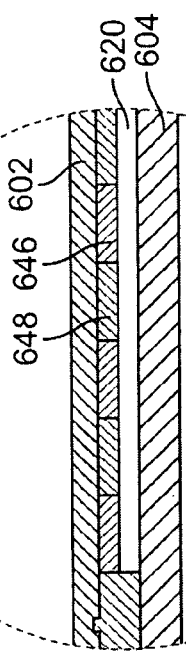
FIG. 6A
FIG. 6B

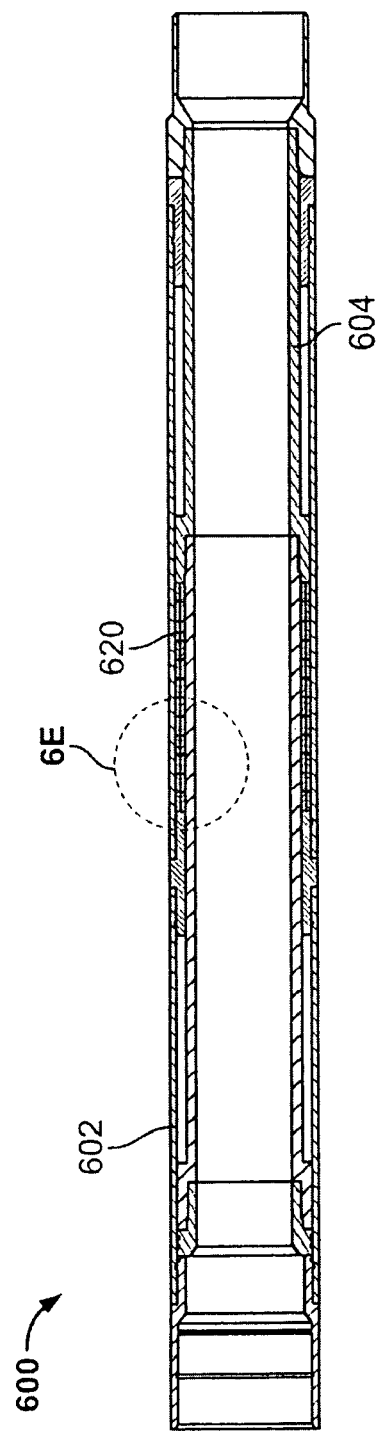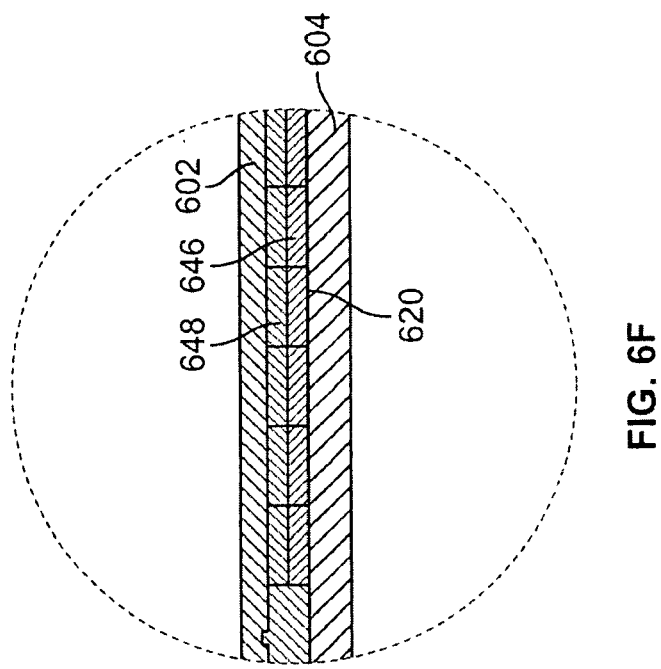

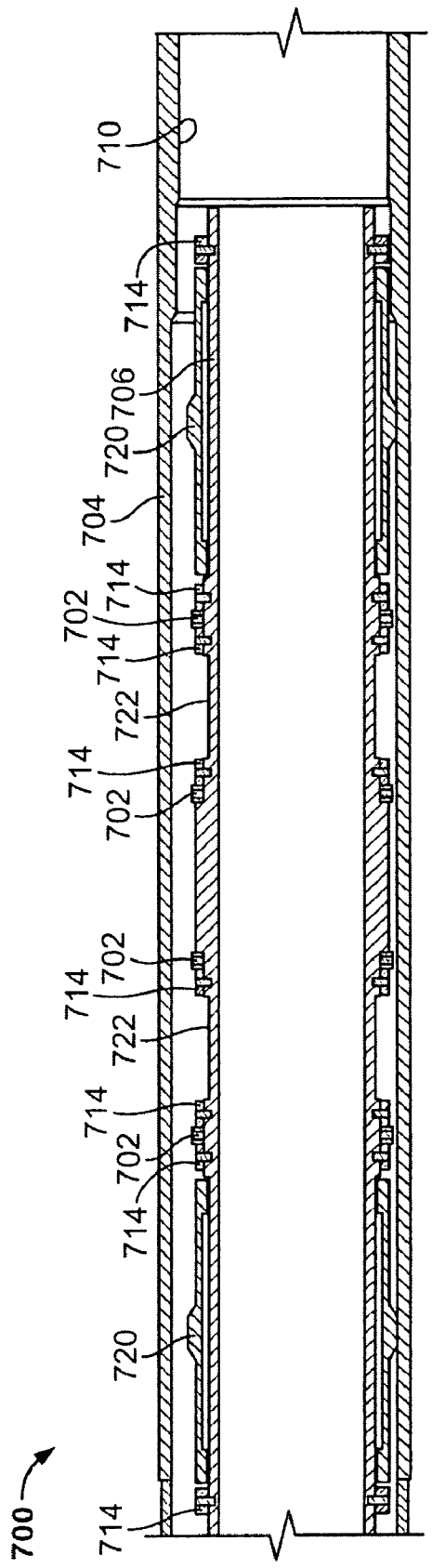
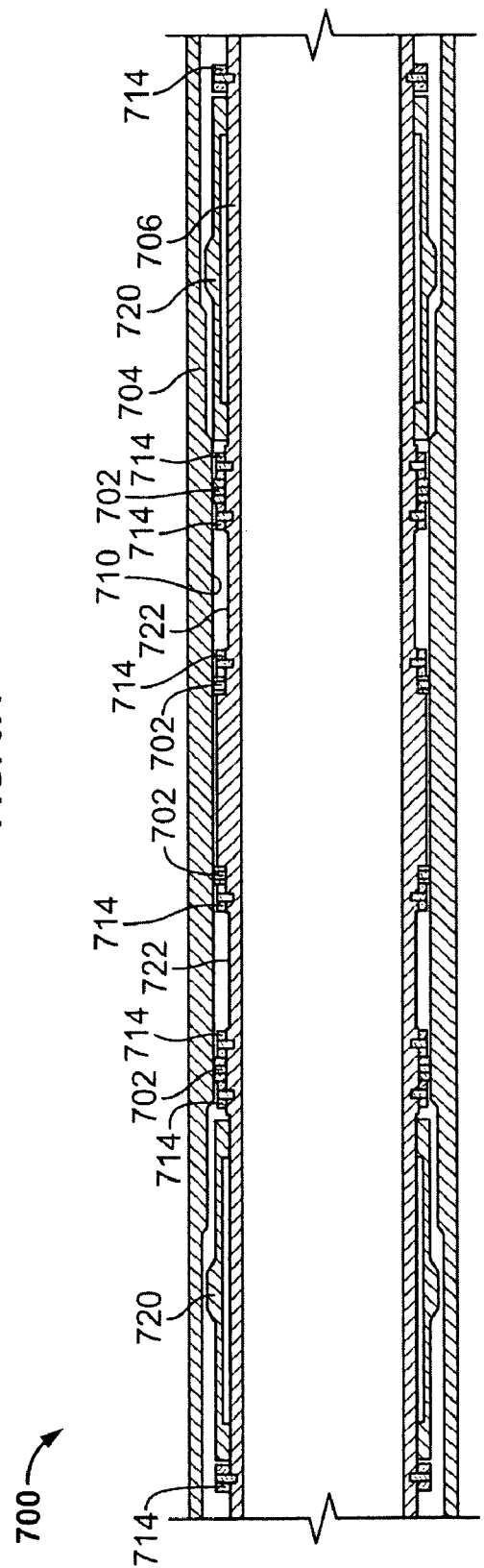
FIG. 9A
FIG. 9B

RECOVERING HEATED FLUID USING WELL EQUIPMENT

BACKGROUND

Fluids in hydrocarbon bearing formations may be accessed via wellbores that extend down into the ground toward the targeted subterranean zones. In some cases, fluids in the hydrocarbon formations may have a low enough viscosity that the fluids readily flow from the zone to the ground surface. Some hydrocarbon formations have fluids with a higher viscosity, that may not freely flow from the formation. These higher viscosity fluids are occasionally referred to as "heavy oil." In the past, the high viscosity fluids, i.e. heavy oil, remained untapped due to an inability to economically recover them. More recently, as the demand for oil has increased, commercial operations have expanded to the recovery of such heavy oil deposits.

In some circumstances, the application of heated treatment fluids (e.g., steam) to the formation may reduce the viscosity of the heavy oil, so as to facilitate economically and practically viable extraction. The systems to deliver the steam to the subterranean zones and the systems that recover the heavy oil to the surface must be able to withstand the temperatures and temperature variations encountered in using heated treatment fluids.

SUMMARY

An aspect encompasses a device having a first elongate tubular body adapted to reside in a wellbore and a second elongate tubular body coupled to the first tubular body and adapted to reside in the wellbore. The device changeable between the first tubular body axially fixed against movement in a first direction relative to the second tubular body and axially moveable in the first direction relative to the second elongate tubular body in response to temperature.

Another aspect encompasses a downhole tool system. The downhole tools system has a first tubing associated with a heated fluid communication system and a second tubing associated with the heated fluid communication system. The first and second tubings are concentrically arranged. A first metallic split seal ring is carried on the second tubing and sealed to the second tubing. The first seal ring is springingly biased in sealing contact against the first tubing. A second metallic split seal ring is carried on the second tubing and abuts the first seal ring. The second seal ring is springingly biased in sealing contact against the first tubing. The first and second seal rings are arranged with a split in the first seal ring overlapped by the second seal ring.

In another aspect, a device includes a first elongate tubular body adapted to reside in a wellbore. The device includes a second elongate tubular body coupled to the first tubular body and adapted to reside in the wellbore. The device is changeable between the first tubular body being axially fixed against movement in a first direction relative to the second tubular body and axially moveable in the first direction relative to the second tubular body in response to temperature.

In another aspect, a well system for accessing a subterranean zone includes a wellbore through which heated treatment fluid is communicated in the subterranean zone. The system includes a first tubing extending in the wellbore, a second tubing extending in the wellbore, and an expansion joint between the first tubing and the second tubing. The expansion joint is changeable, based on temperature, between being fixed against axial contraction and able to axially contract.

In another aspect, a string is pushed into a wellbore with a rigid joint, and the joint is changed, in response to temperature, to allow axial retraction of the joint.

In another aspect, a downhole tool system includes a first tubing associated with a heated fluid communication system and a second tubing associated with the heated fluid communication system. The first and second tubings are concentrically arranged. The system further includes a first metallic split seal ring carried on the second tubing and sealed to the second tubing. The first seal ring is springingly biased in sealing contact against the first tubing. The system further includes a second metallic split seal ring carried on the second tubing and abutting the first seal ring. The second seal ring is springing biased in sealing contact against the first tubing. The first and second seal rings are arranged so that a split in the first seal ring is overlapped by the second seal ring.

In another aspect, a flow of fluid is received between first and second concentrically arranged tubings. The flow is at a temperature of approximately 250° C. or greater. A plurality of metal split seal rings residing between the first and second tubings seal against the flow.

In another aspect, a well system includes a heated fluid communication wellbore. The system includes a first tubing in the heated fluid communication wellbore coupled to a source of heated treatment fluid. The system includes a second tubing concentrically receiving the first tubing. The system includes multiple metallic split seal rings residing between the first and second tubing and sealing between the first and second tubing.

Embodiments may include one or more of the following features. The first elongate tubular body is changeable between axially fixed against movement in the first direction relative to the second tubular body and axially movable in the first direction relative to the second tubular body in response to temperature above a specified temperature. The device includes a phase change material that is solid below the specified temperature and flowable above the specified temperature. The phase change material resides about the second tubular body and, when solid, axially fixes the first tubular body against movement in the first direction relative to the second elongate tubular body. The phase change material grips a profile defined by the first and second tubular bodies when solid. The phase change material resides in an annulus defined between the first tubular body and the second tubular body. The first tubular body is sealed to the second tubular body with two or more split metal seal rings arranged so that a gap in one seal ring is overlapped by an adjacent seal ring. The device includes a hydraulic volume about the second tubular body. The phase change material seals the hydraulic volume when the phase change material is solid, and the phase change material does not seal the hydraulic volume when the phase change material is flowable. A fluid in the hydraulic volume, when sealed in the hydraulic volume, axially fixes the first tubular body against movement in a first direction relative to the second tubular body. The device further includes a shape memory metal that resides in a first shape below the specified temperature and resides in a second, different shape above the specified temperature. The shape memory metal resides between the first tubular body and the second tubular body. When in the first shape, the shape memory metal engages the first tubular body to the second tubular body. When in the second shape, the shape memory metal allows axial movement in the first direction of the first tubular body relative to the second tubular body. The first elongate tubular body is telescopically received within the second elongate tubular body. The shape memory alloy resides in interference between the first tubular body and the second tubular body when in the first shape and out of interference when in the second shape. The specified temperature is less than 200° C. Heated treatment is injected into the subterranean zone though the wellbore. The expansion joint is fixed against axial contraction when at a temperature below a specified temperature and able to axially contact when above the specified temperature. The specified temperature is at or below the temperature of the heated treatment fluid. The expansion joint includes a housing coupled to the first tubing. The expansion joint includes a body coupled to the second tubing. The body is telescopically received in the housing. The expansion joint includes a phase change material residing between the housing and body. The phase change material is solid below the specified temperature and flowable above the specified temperature. The phase change material, when solid, grips the housing and the body and axially fixes the body relative to the housing. The expansion joint includes a housing coupled to the first tubing, and a body coupled to the second tubing. The body is telescopically received in the first tubing. The expansion joint includes a hydraulic volume about the body and a phase change material that is solid below the specified temperature and flowable above the specified temperature. The phase change material seals the hydraulic volume when the phase change material is solid. The phase change material does not seal the hydraulic volume when the phase change material is flowable. A fluid in the hydraulic volume, when sealed in the hydraulic volume, axially fixes the body against movement in a first direction relative to the housing. The expansion joint includes a shape memory metal residing between the housing and the body, the shape memory metal has a first shape below the specified temperature and a second, different shape above the specified temperature. When the shape memory metal is in the first shape it engages the housing to the body, and when the shape memory metal is in the second shape it allows axial movement of the body relative to the housing. The well system further includes a third tubing and a second expansion joint between the first tubing and the third tubing. The second expansion joint is changeable, based on temperature, between being fixed against axial contraction and able to axially contract. The second tubing comprises a permeable liner. Changing the joint in response to temperature includes changing the joint to allow axial retraction when steam is communicated in the wellbore through the string. Changing the joint includes changing a phase change material from solid to flowable. Changing the joint includes changing a shape memory metal from a first shape to a second shape. The second tubing carries a Bellville spring that biases the first seal ring to abut the second seal ring. The first seal ring is C-shaped having a gap between ends of the seal ring. The second seal ring has a protrusion on a lateral surface thereof configured to fit in the gap of the first seal ring and retain the first seal ring relative to the second seal ring so that the gap of the first seal ring is overlapped by the second seal ring. The first tubing is a housing of an expansion joint, and the second tubing is a body of the expansion joint. The downhole tool system further includes a phase change material residing between the housing and body. The phase change material is solid below a specified temperature and flowable above the specified temperature. The first tubing is a housing of an expansion joint and the second tubing is a body of the expansion joint. The downhole tool system further includes a hydraulic volume about the body. The downhole tool system further includes a phase change material that is solid below the specified temperature and flowable above the specified temperature. The downhole tool system further includes a fluid in the hydraulic volume that, when sealed in the hydraulic volume, axially fixes the body against movement in a first direction relative to the housing. The first tubing is coupled to a permeable liner of the heated fluid communication system and the second tubing is a heated fluid communication string of the heated fluid communication system. The first and second seal rings are retained against a shear ring frangibly affixed to the second tubing. The first and second seal rings maintain sealing at 250° C. and greater. The first and second seal rings are not substantially plastically deformed in sealing. The plurality of split seal rings are arranged so that the split in each ring is overlapped by the solid portion of another seal ring. A plurality of the seal rings are C-shaped having a gap between ends of the seal ring. A plurality of the seal rings have a protrusion on a lateral surface thereof configured to fit in the gap of an adjacent seal ring and retain the adjacent seal rings so that the gap of one is overlapped by a solid portion of the other. The first and second tubings are elements of an expansion joint. The second tubing is a liner. Passage of flow through the split of one of the seal rings is sealed against with another of the seal rings. The seal ring is retained relative to the second tubing with a shear ring frangibly affixed to the second tubing. The shear ring is released from the second tubing to release the seal ring from sealing between the first and second tubings. Releasing is performed by shearing a shear member affixing the shear ring to the second tubing.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 2A and 2B are side cross-sectional views of an example expansion joint, wherein FIG. 2A depicts the example expansion joint in an extended state and FIG. 2B depicts the expansion join in a retracted state.

FIG. 3 is a side cross-sectional view of another example expansion joint.

FIGS. 4A-4C are cross-sectional views of another example expansion joint, wherein FIG. 4A is a side cross-sectional view, FIG. 4B is a detail side cross-sectional view, and FIG. 4C is an end cross-sectional view along line C-C.

FIG. 5 is a side cross-sectional view of another example expansion joint.

FIGS. 6A-6F are side cross-sectional views of another example expansion joint, wherein FIG. 6A depicts the example expansion joint in an extended state, FIG. 6B is a detail of B, FIG. 6C depicts the example expansion joint in an extended state.

FIG. 6D is a detail of D, FIG. 6E depicts the example expansion joint in a retracted state, and FIG. 6F is a detail of F.

FIGS. 9A, 9B, and 9C are side cross-sectional views of an example sealing system.

Like reference symbols in the various drawings indicate like elements.

DETAILED DESCRIPTION

Figure 1:
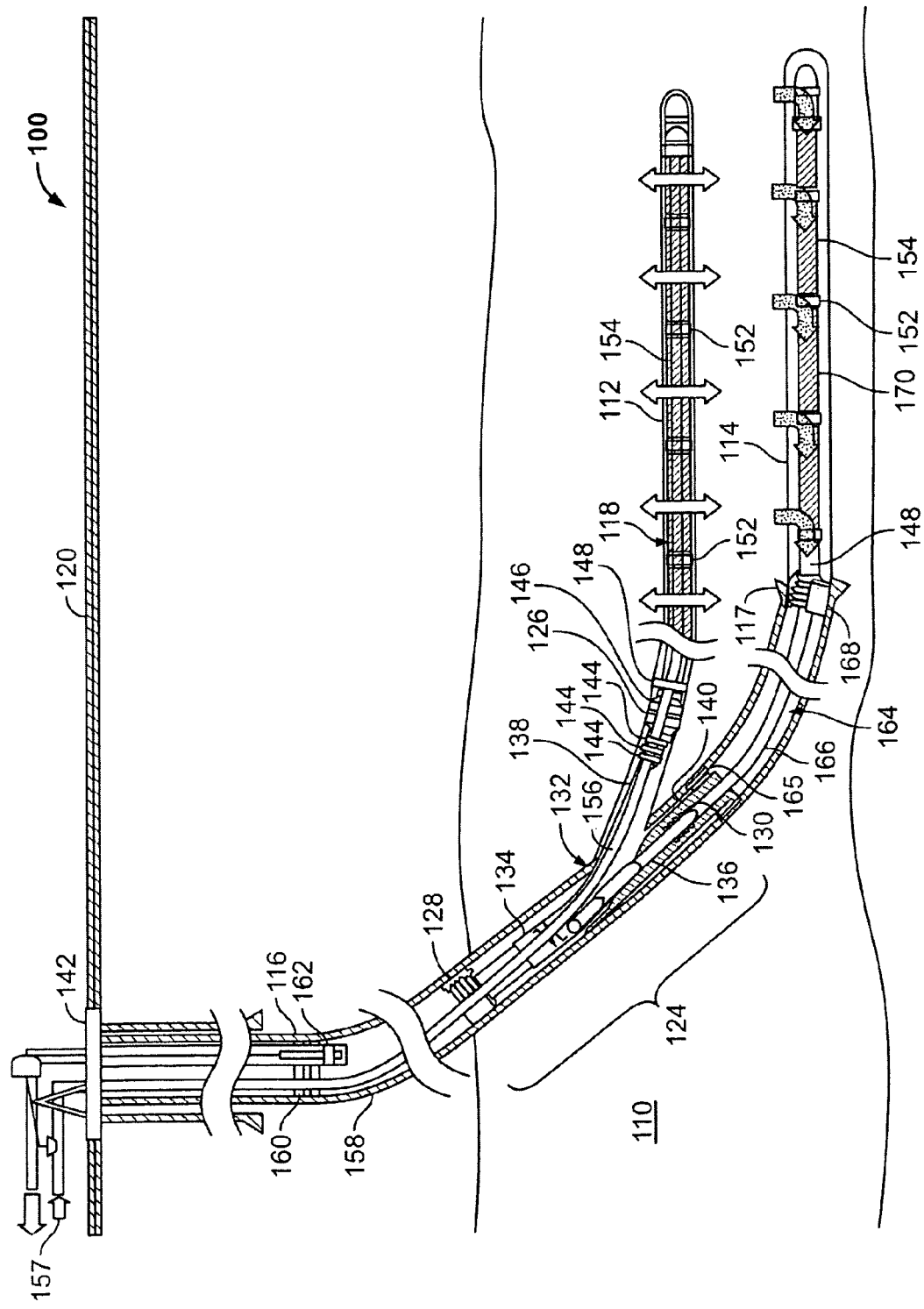
FIG. 1 is a schematic view of an example well system.

FIG. 1 depicts an example well system 100 for thermally enhanced resource recovery from a subterranean zone 110.

The well system 100 delivers heated treatment fluid to the subterranean zone 110 and produces reservoir fluids to the surface. The subterranean zone 110 can include an entire formation, multiple formations, or a portion of a fluid producing formation. Well system 110 is an example of a Steam Assisted Gravity Drainage (SAGD) system. The system 100 includes a lateral injection wellbore 112 and a lateral production wellbore 114 extending from a primary or main wellbore 116 into the subterranean zone 110. As illustrated, treatment fluids for thermally enhanced resource recovery are injected into the subterranean zone 110 through the injection wellbore 112 and reservoir fluids are produced from the subterranean zone 110 through the production wellbore 114. The main wellbore 116 extends from the terranean surface 120 to a casing footer 117 in or near the subterranean zone 110. The production wellbore 114 extends from the end of the main wellbore 116. In certain instances, fewer or more lateral wellbores can be provided extending from the main wellbore 116.

Figure 7:
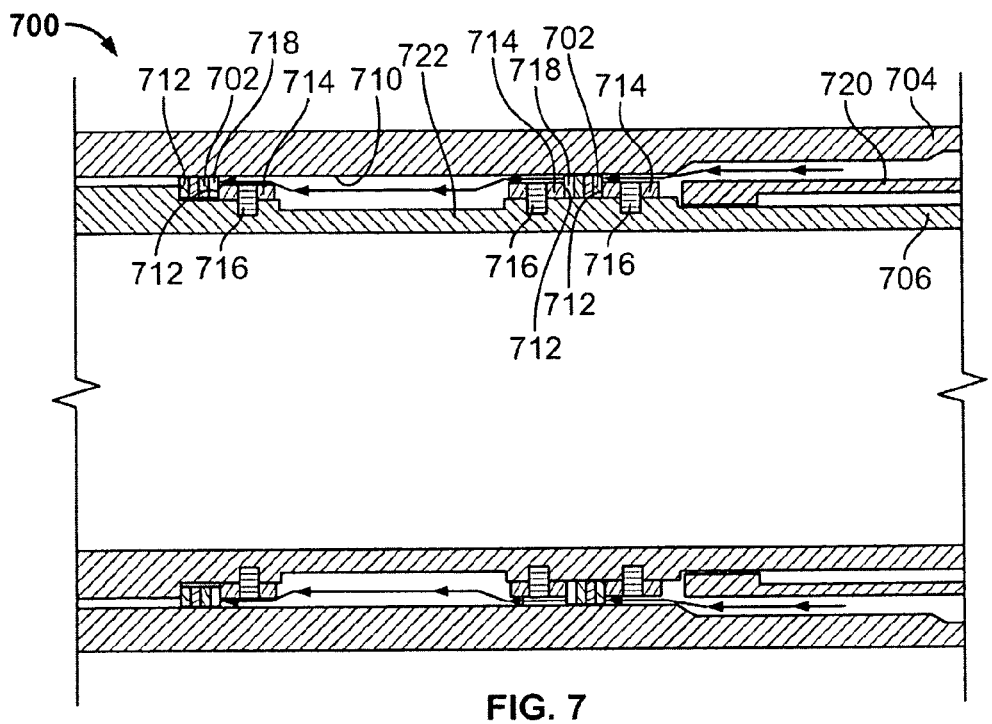
FIG. 7 is a side cross-sectional view of a sealing system of an expansion joint.
Figure 8A:
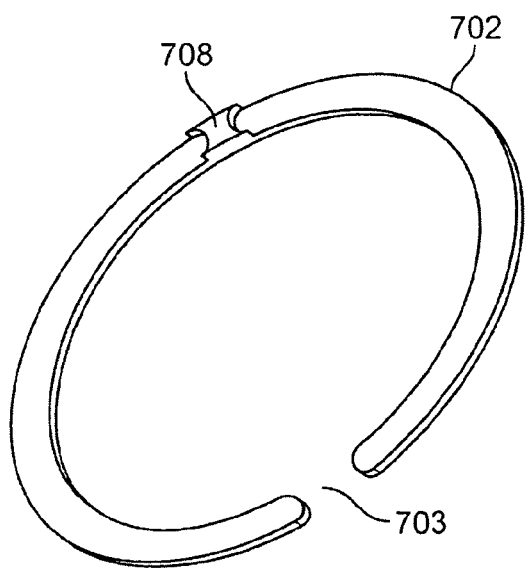
FIGS. 8A and 8B are perspective views of a seal ring for use in sealing aspect of FIG. 7.
Figure 8B:
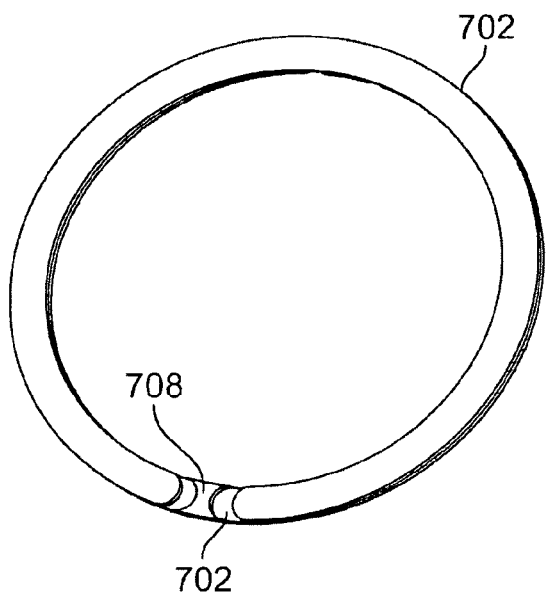

A permeable injection liner string 118 is disposed in the injection wellbore 112. The injection liner 118 includes apertured tubing, sand screens and/or other types of permeable tubing and is adapted to communicate treatment fluids into the subterranean zone 110. The injection liner 118 extends from a liner junction device 124 installed at the junction 132 between the injection wellbore 112 and the main wellbore 116. The illustrated liner junction device 124 includes an upper seal assembly 128 (e.g., a packer, a packer liner hanger, a high temperature seal such as that described with respect to FIG. 7, and/or other seal assembly) that engages the casing 158 of the main wellbore 116 (e.g., by slips, a profile and/or otherwise) to support the liner junction device 124 and/or other seal assembly. A second leg 136 of junction 132 extends downhole direction in the main wellbore and is sealingly coupled to a lower lateral tieback and seal assembly 164 disposed in the main wellbore 116 downhole of the junction 132. In certain instances, the second leg 136 stabs into and seals in a polished bore receptacle 130 in the lower lateral tieback and seal assembly 164. In certain instances, the second leg 136 can seal to the polished bore receptacle with a high temperature seal such as that described below with respect to FIG. 7. The first leg 138 of the liner junction device 124 extends from the body 134 of the liner junction device 124 into the injection wellbore 112 and is coupled to the injection liner 118, for example, at a swivel joint 146. The lateral tieback and seal assembly 164 can engage the casing 158 of the main wellbore 116 with a latch assembly 165. One example of a latch assembly that can be used in the systems described herein includes a LatchRite® assembly commercially available from Halliburton Energy Services, Inc. The uphole end of the lower lateral tieback and seal assembly 164 includes a bore deflector 140, adapted to deflect the injection liner 118 into the injection wellbore 112 when the injection liner 118 and liner junction device 124 are run-in through the main wellbore 116. Examples of junction devices that can be used in the described configuration include the FlexRite® junction produced by Halliburton Energy Services, Inc., the RapidExclude™ junction produced by Schlumberger, and/or other junctions. In certain instances, the FlexRite® junction used in this context can provide a Technical Advancement of Multilaterals (TAML) level 5 seal. In other words, the junction is sealed against flow of gas and/or liquid, so that all or substantially all flow from the production wellbore 114 and flow to the injection wellbore 112 is retained within the liner junction device 124.

In the illustrated embodiment, a swivel 146 connects the liner junction device 124 to the injection liner 118, and allows the injection liner 118 to rotate (i.e., swivel) around its central axis. The liner junction device 124 can be configured with a seal 126 (e.g., a swellable packer, an inflatable packer, a high temperature seal such as described with respect to FIG. 7 below, and/or other seal) to seal against flow from the injection wellbore 112 into the main wellbore 116 in the annulus between the injection liner 118 and a wall of the injection wellbore 112. Additionally or alternatively, a seal in the annulus between the injection liner 118 and the wall of the injection wellbore 112 may be formed by depositing cement in the annulus. In certain instances, the cement may be a thermally resistant cement such as STEAMSEAL® cement available from Halliburton Energy Services, Inc.

One or more expansion joints 148 is provided in the injection liner 118. FIG. 1 shows an expansion joint 148 at the interface between the swivel 146 and the injection liner 118. The expansion joint 148 is a device configured to expand and/or retract axially. Additional details on the expansion joint 148 are described below.

One or more flow distribution valves 152 can be included in the liner 118 to distribute and/or control flow from the interior of the liner 118 into the subterranean zone 110. Some examples of flow distribution valves 152 are described in U.S. patent application Ser. No. 12/039,206, entitled "Phase-Controlled Well Flow Control and Associated Methods," U.S. patent application Ser. No. 12/123,682, entitled "Flow Control in a Wellbore," And U.S. Pat. No. 7,032,675, entitled "Thermally Controlled Valves and Methods of Using the Same in a Wellbore." The flow distribution valves 152 can either be concentrically deployed inside the lateral injection liner 118 using a separate tubular or can be deployed with the liner 118. Blank pipe and/or packers can additionally included in the injection liner 118 to compartmentalize the flow through distribution valves 152.

A treatment fluid injection string 156 extends from wellhead 142 down main wellbore 116, through the first leg 138 of the liner junction device 124, and terminates in the liner 118. The injection string 156 is coupled to a source of heated treatment fluid 157 at the surface 120, or as discussed below, within well system 100 (e.g., a downhole fluid heater). Heated fluid, such as steam, air, carbon dioxide and/or other fluids, can be injected into the subterranean zone via the treatment fluid injection string 156. In the illustrated embodiment, a seal centralizer 160 disposed in the main wellbore 116 helps set the positions of the treatment fluid injection string 156 and a production pump 162 (e.g., an inlet for a rod pump, an electric submersible pump, a progressive cavity pump, and/or other fluid lift system). Produced reservoir fluids that flow up from the production lateral 114, through the liner junction 124 can be produced to the surface with the production pump 162.

Seals 144 are positioned to provide a seal between an outer surface of the treatment fluid injection string 156 and an inner surface of the first leg 138. In other instances, the seals 144 can be positioned to seal against the interior of the lateral injection liner 118 or another component downhole from the junction liner device 124. The seals 144 seal against the return flow of treatment fluid (in liquid and/or gaseous form) along the annulus between the treatment fluid injection string 156 and the inner surface of the first leg 138 into the liner junction device 124. In certain instances, the seals 144 can include a polished bore receptacle, packer and/or other type of seal. Although three seals 144 are depicted, fewer or more seals can be provided.

A permeable production liner string 170 extends into the production wellbore 114. The lower lateral tieback and seal assembly 164 includes lower lateral space out tubing 166 that extends downhole to the production lateral liner 170. The downhole end of the lower lateral space out tubing 166 is sealingly received in a lower seal assembly 168 disposed in the main wellbore 116. Some examples of lower seal assembly 168 include a packer, a packer liner hanger that engages the casing 158 of the main wellbore 116 (e.g., by slips, a profile and/or otherwise) to support the production lateral liner 170 and/or other seal assembly. Additionally or alternatively, a seal in the annulus between the production lateral liner 170 and the wall of the production wellbore 114 may be formed by depositing cement in the annulus. In certain instances, the cement may be a thermally resistant cement. Like the injection liner 118, the production lateral liner 170 can include one or more joints of permeable tubing 154, one or more flow distribution valves 152 (e.g., to control/distribute inflow into the interior of the liner 170) and one or more expansion joints 148. The flow distribution valves 152 can either be concentrically deployed inside the production liner 170 using a separate tubular or can be deployed with the liner 170. Blank pipe and/or additional packers can be included in the production liner 170 to compartmentalize the flow through distribution valves 152.

The expansion joint 148 can be configured to absorb, and thus isolate, the remainder of the system 100 from axial expansion and/or contraction of injection liner 118 and/or production liner 170 due to thermal effects. For example, injecting heated treatment fluid into the subterranean zone 110 through the injection liner 118 tends to cause the injection liner 118 to expand. The expansion joint 148 can be configured to retract from an axially extended state in an amount equal to the axial expansion of the injection liner 118 communicated to the expansion joint 148. In doing so, the expansion joint 148 will isolate the remainder of the system 100 from the axial expansion of the injection liner 118. After the heated treatment fluid injection has ceased and the subterranean zone 110 begins to cool. The injection liner 118 likewise cools and thus tends to contract. The expansion joint 148 can be configured to extend from an axially retracted state in an amount equal to the axial contraction of the liner 118 that is communicated to the expansion joint 148. In doing so, it will isolate the remainder of the system 100 from the contraction of the injection liner 118. In a similar manner, the expansion joint 148 in the production liner 170 isolates the remainder of the system 100 from expansion and contraction of the production liner 170.

Although shown as one expansion joint 148 in each of the injection liner 118 and production liner 170, multiple expansion joints 148 can be provided in one or both of the liners. The expansion/retraction capacity of expansion joints 148 provided in the same string is additive. For example, two expansion joints 148 of the same expansion/retraction capacity provided in the same string can provide two times the total expansion/retraction capacity, three expansion joints 148 of the same expansion/retraction capacity provided in the same string can provide three times the total expansion/retraction capacity, and so on. Thus, in certain instances, multiple expansion joints 148 can be provided in the injection liner 118 and/or production liner 170 to increase the amount of axial expansion/retraction that can be absorbed. Multiple expansion joints 148 may alternatively or additionally be provided at different locations along the injection liner 118 and/or production liner 170 to absorb expansion/contraction at different locations. The expansion joints 148 can be provided at equal and/or unequal intervals along the length. In certain instances, the expansion joints 148 can be arranged based on a temperature profile of the injection liner 118 and/or production liner 170, locations of mechanical constraints (e.g., interfaces with other components or equipment, such as liner junction device 124, lower seal assembly 168 and/or other) and/or based on other factors. For example, the heel of the injection liner 118 and the heel of the production liner 170 are constrained by interfaces with the liner junction device 124 and lower seal assembly 168, respectively. In some configurations, the heel of the injection liner 118 may also be subject to greater temperature variation, and thus greater expansion/contraction, than other portions of the injection liner 118. Thus, it may be desirable to provide a greater concentration (e.g., number per unit length of liner) of expansion joints 148 can be provided near the heel of the injection liner 118 and/or production liner 170.

In certain instances, the expansion joint 148 can be configured to be selectively changeable between axially rigid and not rigid (i.e., able to axially extend and/or retract). The expansion joint 148 can be configured to change from axially rigid to not rigid mechanically (e.g., by mechanical manipulation of the expansion joint 148 via the string, a tool for changing the expansion joint 148, and/or otherwise), in response to hydraulic pressure (e.g., pressure in the bore and/or about the exterior of the expansion joint 148, pressure via a hydraulic signal passage to the expansion joint, and/or otherwise), in response to temperature and/or in another manner. For example, the expansion joint 148 can be configured rigid to maintain the extended state while pushing a string of tubing and/or equipment (e.g., injection liner 118 or production liner 170, discussed below) into a wellbore. When changed to not rigid, the expansion joint 148 can axially retract and subsequently axially extend to account for thermal expansion/retraction of a string of tubing and/or equipment (e.g., injection liner 118 or production liner 170) coupled to the expansion joint 148.

In instances where the expansion joint 148 is changeable from axially rigid to not rigid when subject to a specified temperature (hereinafter the "actuation temperature"), the expansion joint can be configured to be rigid when above the actuation temperature and not rigid when below the actuation temperature or vice versa. The actuation temperature can be selected in relation to the temperature conditions to which the expansion joint 148 will be exposed. It is possible that expansion joints 148 in different locations in system 100 will have different actuation temperatures.

In certain instances, the expansion joint 148 can be configured with an actuation temperature that ensures the expansion joint 148 is rigid while being run-in to facilitate pushing a string of tubing and/or equipment coupled to the expansion joint 200 into a wellbore (e.g., pushing the injection liner 118 and/or production liner 170 into its respective wellbore). The actuation temperature, however, can be such that after expansion joint 200 and any string coupled to it are in place, the expansion joint 200 becomes not rigid when the expansion joint 200 and/or string coupled to it are subjected to thermal conditions that cause substantive expansion and/or contraction. In one example, the expansion joint 148 provided in injection liner 118 is configured with an actuation temperature that is above the ambient temperature in the main wellbore 116 and injection wellbore 112, but is within or below the expected range of temperatures of the expansion joint 148 when heated treatment fluid is injected through injection liner 118 into injection wellbore 112. As such, the expansion joint 148 is rigid while injection liner 118 is run into injection wellbore 112 at ambient temperatures. Thereafter, the expansion joint 148 is not rigid as heated treatment fluid is injected through injection liner 118 into the wellbore 112. In another example, the expansion joint 148 provided in production liner 170 can be configured with an actuation temperature that is above the ambient temperature in the main wellbore 116 and production wellbore 112, but is within or below the expected range of temperatures of the expansion joint 148 when reservoir fluids are produced from production wellbore 114 through production liner 118. In certain instances, the actuation temperature can be a temperature in the range of 100-200° C., 200-300° C., 300-400° C. or other temperature above 400° C. or below 100° C.

In the illustrated embodiment, the main wellbore 116 has a substantially vertical entry portion extending from the terranean surface 120 that then deviates to form a slanted portion from which substantially horizontal lateral wellbores extend into to the subterranean zone 110. However, the systems and methods described herein can also be used with other wellbore configurations (e.g., slanted wellbores, horizontal wellbores, and other configurations) and other types of systems that communicate heated fluid in a subterranean zone. Example systems that communicate heated fluid in a subterranean zone include systems that use a common well bore for injection and production (e.g. huff-n-puff systems, cyclic injection systems and/or other systems) and systems with separate injection and producer wells (e.g., SAGD and/or others) and/or others. For example, the concepts described herein could be use in connection with oil shale superheated air (SHA) injection, oil shale heated carbon dioxide injection (e.g. Chevron CRUSH), geothermal production & injection wells, hot water injection, fireflooding and/or in other applications. The systems and methods described herein can also be used in strings used for thermal monitoring applications, including temperature sensing and/or others, where a thermal monitoring string is positioned in a well bore adjacent to a production and/or injection string.

In some cases, a downhole fluid lift system, operable to lift fluids towards the terranean surface 120, is at least partially disposed in the wellbore 114 and may be integrated into, coupled to or otherwise associated with a production tubing string (not shown). To accomplish this process of combining artificial lift systems with heated treatment fluid injection, a downhole cooling system can be deployed for cooling the artificial lift system and other components of a completion system. Such systems are discussed in more detail, for example, in U.S. Pat. App. Pub. No. 2008/0083536, entitled "Producing Resources Using Steam Injection." Other downhole fluid lift systems and methods can also be used.

In certain instances, a downhole fluid heater (e.g., steam generator) can be provided in the well. For example, PCT Application No. PCT/US2008/069249, entitled "Heated Fluid Injection Using Multilateral Wells" describes such a system that can be incorporated into system 100. The downhole fluid heater can be sealingly received in a polished bore receptacle coupled to liner 118 and in the lateral injection wellbore 112.

Turning now to FIGS. 2A through 6F, example expansion joints suitable for use as expansion joint 148 are described. FIGS. 2A-B show an example expansion joint 200 that includes a tubular outer housing 202 internally telescopically receiving a tubular inner body 204. FIG. 2A depicts the expansion joint 200 in a fully axially extended state with the inner body 204 extended from the outer housing 202. The expansion joint 208 can retract to an axially retracted state with the inner body 204 internally received within the outer housing 202. FIG. 2B depicts the expansion joint 208 in the fully axially retracted state. If subjected to temperatures below a specified temperature (referred to herein as the "actuation temperature"), the expansion joint 200 is rigid and can maintain an retracted/extended states under certain loads. For example, in certain instances, the expansion joint 208 can maintain an extended or fully extended state when subjected to loads applied to the expansion joint 200 while pushing a string into a wellbore (e.g., liner 118 into injection wellbore 112). Of note, the term "tubular" is intended to encompass not only cylindrical shapes (as shown), but also shapes with triangular, rectangular, hexagonal, octagonal and/or other cross-sectional shapes.

In certain instances, the outer housing 202 and the inner body 204 can be formed in a single part or multi-part construction. FIG. 2A depicts the outer housing 202 having a coupling end segment 206 configured to couple to other tubing. The coupling end segment 206 is sealingly coupled to an intermediate housing segment 208, that in turn, is sealingly coupled to a inward facing rib 211 and another intermediate housing segment 208. Finally, the outer housing 202 includes a guiding segment 212 sealingly coupled to the intermediate housing segment 208. FIG. 2A depicts the inner body 204 having a coupling end segment 214 at an opposite end of the expansion joint 200 from the coupling end segment 206. As with coupling end segment 206, the coupling end segment 214 is configured to couple to other tubing, for example, by threading and/or otherwise. The coupling end segment 214 is sealingly coupled to an intermediate body segment 216, that in turn, is sealingly coupled to another intermediate body segment 216. Finally, the inner body 204 includes a guiding segment 218 sealingly coupled to the intermediate body segment 216. The sealing coupling between the various segments 206-218 and between the coupling end segment 206 and other tubing can be by mating male and female threads and/or other methods of direct or indirect coupling.

The inner body 204 has a smaller outer diameter than the inner diameter of the outer housing 202, and thus defines an annulus 220 therebetween. Guiding segments 212 and 218 substantially concentrically support the inner body 204 within the outer housing 202. Guiding segment 212 seals to an outer surface of intermediate body segment 216. Similarly, guiding segment 218 seals to an inner surface of the intermediate housing segment 208. In certain instances, the guiding segment 212 and/or the guiding segment 218 can seal using o-rings, other polymer or metallic seal rings, and/or other seals. One example of a suitable sealing system having metallic seal rings is described below with reference to FIG. 7.

The coupling end segment 206 defines an inward facing, retraction stop shoulder 224 that abuts the guiding segment 218 to stop further axial retraction of the inner body 204 when the expansion joint 200 is in the fully axially retracted state. Similarly, the inward facing rib 211 a smaller inner diameter than the remainder of the outer housing 202 and defines an inward facing, expansion stop shoulder 226. Expansion stop shoulder 226 abuts a corresponding shoulder 228 on the intermediate body section 216 to stop further axial extension of the inner body 204 when the expansion joint 200 is the fully axially extended state. The intermediate body segments 216 define a circumferential outward facing rib 232 of larger outer diameter than the remainder of the intermediate body segment 216. In FIGS. 2A and 2B, the intermediate body segments 216 are depicted as external upset tubing, and the outward facing rib 232 is defined by an externally upset portion. However, the outward facing rib 232 can be a rib that is machined, welded, bolted, or otherwise provided on the intermediate body segments 216.

Because the annulus 220 is axially bounded between guiding segment 212 and guiding segment 218, the axial length of the annulus 220 expands and retracts with the expansion and retraction of the expansion joint 200. The annulus 220 contains a phase change material 230 having a specified melting temperature, above which the phase change material 230 is flowable (e.g., gas or liquid) and below which the phase change material 230 is solid (i.e., not flowable). Some examples of phase change materials include eutectic materials, polymer phase change materials and/or other materials. When the expansion joint 200 is in the axially extended state, a substantial volume of the annulus 220 is located between the inward facing rib 211 and seals of the guiding segment 212 on the outer housing 202. The volume of the annulus 220 located between the inward facing rib 211 and the seals of the guiding segment 218 on the inner body 204 is comparatively small. In this state, the phase change material 230 fills the annulus 220. As the expansion joint 200 is axially retracted, the outward facing rib 232 moves towards the inward facing rib 211. The inward facing rib 211 and outward facing rib 232 together define a profile in the annulus 220 that is engaged by the phase change material 230. Thus, when the phase change material 230 is solid it grippingly engages the profile defined by the inward facing rib 211 and the outward facing rib 232, and makes the expansion joint 200 rigid. Stated differently, the phase change material limits or prevents axial retraction/extension of the expansion joint 200 by limiting or preventing movement of the outward facing rib 232 toward the inward facing rib 211. When the phase change material 230 is flowable (e.g., liquid, substantially liquid and/or gas) it allows axial retraction/extension of the expansion joint 200 by allowing movement of the outward facing rib 232 toward the inward facing rib 211.

In operation, the expansion joint 200 can be set in an extended state (e.g., a fully or partially extended state) and rigidly retained in the extended state by maintaining the phase change material 230 below the actuation temperature. The expansion joint 200 then operates similar to a segment of rigid tubing, and can be used to push a string of tubing and/or equipment coupled to the expansion joint 200 into a wellbore. In certain instances, the phase change material 230 can be maintained below the actuation temperature by maintaining the ambient temperature about an exterior of and inside the expansion joint 200 below the actuation temperature. If the actuation temperature is selected to be above the ambient temperature in the wellbore, no active steps are needed to maintain the expansion joint 200 rigid. The expansion joint 200 can be changed to be not rigid by heating the phase change material 230 above the actuation temperature. As the phase change material 230 becomes flowable, the expansion joint 200 can retract and extend as needed. In certain instances, the phase change material 230 can be heated above the actuation temperature by flowing fluid that is at or above the actuation temperature through the interior and/or about an exterior of the expansion joint 200. For example, if the expansion joint 200 is provided in an injection string for thermally enhanced resource recovery, the actuation temperature can be selected such that injecting the heated treatment fluid (e.g., steam) through the injection string will raise the temperature of the phase change material 230 above the actuation temperature and cause the expansion joint 200 to become not rigid. The expansion joint 200 can thereafter be changed between not rigid and rigid, as desired, by heating or cooling (or allowing to cool) the phase change material 230. In certain instances, fluid at a temperature below the actuation temperature can be flowed about an exterior of or inside the expansion joint 200 to cool the phase change material 230 below the actuation temperature.

Of note, multiple inward facing ribs 211 and outward facing ribs 232 can be provided to define two or more deposits of phase change material 230. For example, FIG. 3 shows an alternate expansion joint 300 having two inward facing ribs 211 and two outward facing ribs 232 defining two deposits of phase change material 230. Such a configuration increases the load capacity, i.e. the resistance against retraction/extension of the expansion joint 200 when the phase change material 230 is solid, by distributing the loads applied on the phase change material 230 over a greater surface area. Other aspects and operation of expansion joint 300 are similar to the expansion joint 200 described above.

Figure 4B:
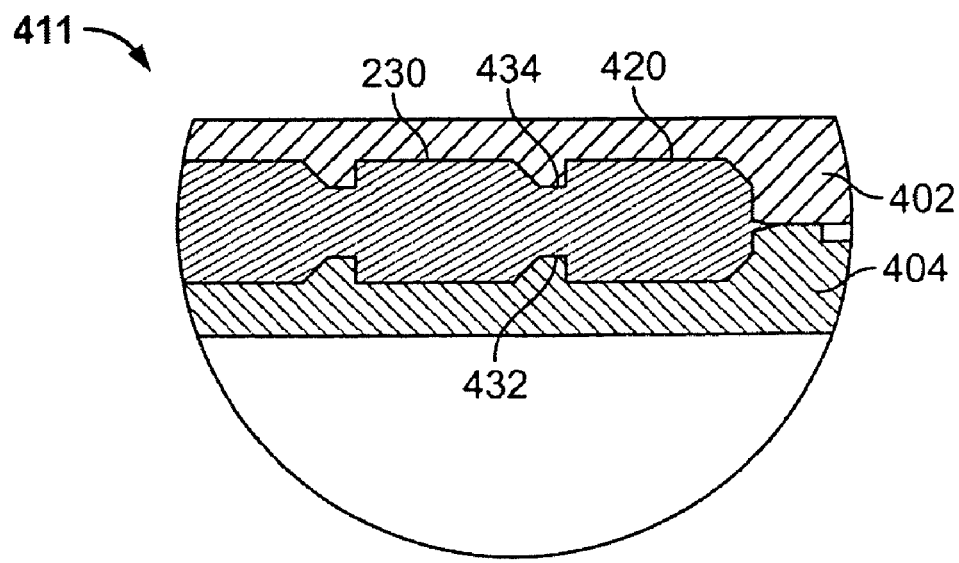
Figure 4C:
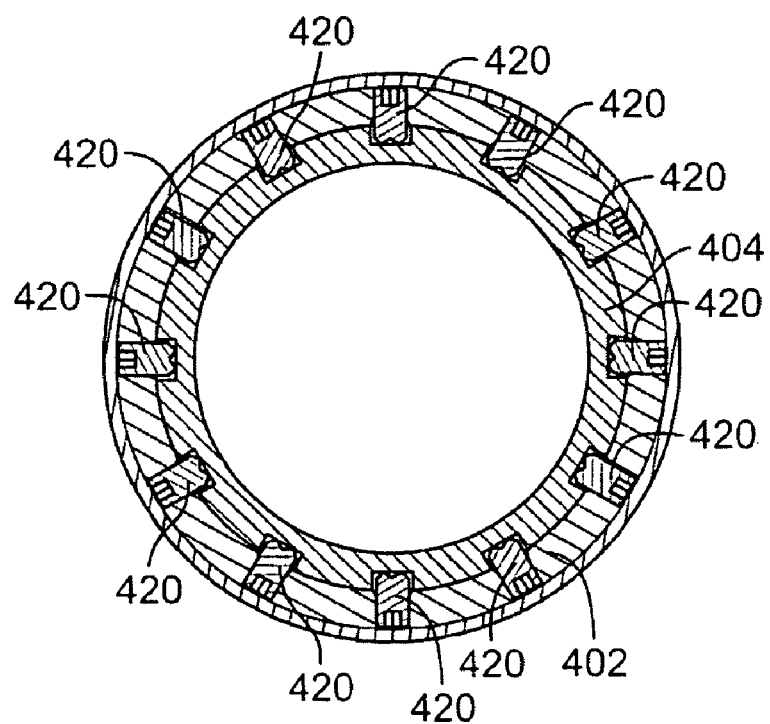
Figure 6C:
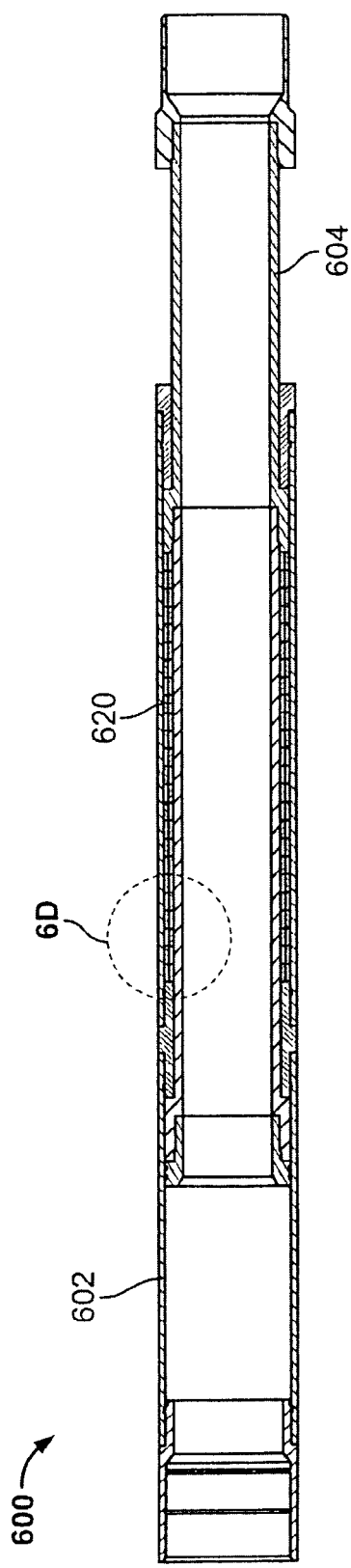
Figure 6D:
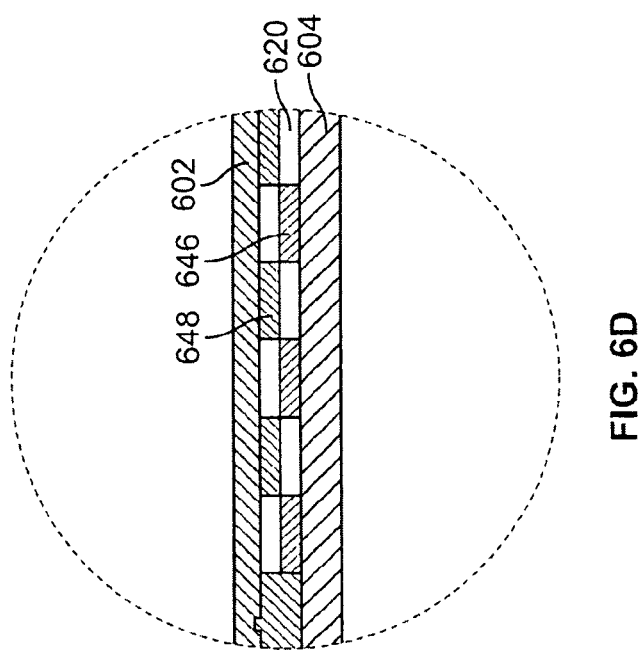

The inward facing and outward facing ribs can take different forms. For example, FIGS. 4A-C show an alternate expansion joint 400 having numerous inward facing ribs 434 and numerous outward facing ribs 432 of a different configuration than those of FIGS. 2A-B. As seen best seen in FIG. 4C, the tubular outer housing 402 and tubular inner body 404 define a plurality of axially oriented elongate annular spaces 420 therebetween. In some instances, the housing 402 and the inner body 404 define a single circumferential chamber rather than multiple axially oriented spaces 420. Each contains phase change material 230. The ribs 434 and ribs 432 are circumferentially oriented in the elongate annular spaces 420. As above, the inward facing ribs 434 and outward facing ribs 432 together define a profile that is engaged by the phase change material 230 when solid. Thus, when the phase change material 230 is solid, it grippingly engages the inward facing ribs 434 and the outward facing ribs 432, and makes the expansion joint 400 rigid. When the phase change material 230 is flowable, it can flow from the axial annular spaces 420 into an adjacent collection space 440 in the inner body 404 to allow axial retraction/extension of the expansion joint 400. FIG. 4A depicts the expansion joint 400 in an fully extended state, and thus no further axial extension is possible. However, the expansion joint 400 can be initially arranged with the inner body 404 received further into the outer housing 402 to allow initial axial expansion as desired. Also, after an initial axial retraction from the fully extended state, the expansion joint 400 can thereafter extend. Although twelve elongate annular spaces 420 are shown, fewer or more can be provided. Expansion joint 400 further includes guide pins 436 (two shown, one or more can be provided) carried on the outer housing 402 that engage axial slots 438 in the inner body 404. The guide pins 436 and axial slots 438 cooperate to prevent rotation of the outer housing 402 relative to the inner body 404, yet allow axial retraction/expansion of the expansion joint 400. Similar guide pins and slots can be provided on the other expansion joints described herein. Other aspects and operation of expansion joint 400 are similar to the expansion joint 200 described above. For example, as above, the guiding segment can seal to the outer housing 402 using o-rings, other polymer or metallic seal rings (e.g. as in FIG. 7 and/or otherwise), and/or other seals.

In certain instances, the phase change material cooperates with another fluid in operation of the expansion joint. In the example expansion joint 500 of FIG. 5, the annulus 520 between the tubular outer housing 502 and tubular inner body 504 defines a sealed hydraulic volume. The annulus 520 is sealed at one end at the interface of the outer housing 502 and inner body 504 (e.g., by o-rings and/or otherwise). The phase change material 230, when solid, resides in a circumferential receptacle 544 defined on inner body 504 and abuts the outer housing 502 to seal the other end of the annulus 520. The annulus 520 is filled with a fluid 542 (e.g., an incompressible liquid and/or other fluid). The fluid 542 supports axial loads applied to the expansion joint 500 when the phase change material 230 is solid, because the fluid is sealed in the annulus 520 by the phase change material 230. Thus, when the phase change material 230 is solid, the expansion joint 500 is rigid. When the phase change material 230 is flowable, it can flow from the circumferential receptacle 544 into an adjacent collection space 540 in the inner body 504, unsealing the annulus 520. With the annulus 520 unsealed, the fluid 542 is free to flow into the adjacent collection space 540 and allow axial retraction/extension of the expansion joint 500. FIG. 5 depicts the expansion joint 500 in an fully extended state, and thus no further axial extension is possible. However, the expansion joint 500 can be initially arranged with the inner body 504 received further into the outer housing 502 to allow initial axial expansion as desired. Also, after an initial axial retraction from the fully extended state, the expansion joint 500 can thereafter extend. As above, expansion joint 500 further includes guide pins 536 (two shown, one or more can be provided) carried on the outer housing 502 that engage axial slots 538 in the inner body 504. The guide pins 536 and axial slots 538 cooperate to prevent rotation of the outer housing 502 relative to the inner body 504, yet allow axial retraction/expansion. Other aspects and operation of expansion joint 500 are similar to the expansion joint 200 described above. For example, as above, the guiding segment 518 can seal to the outer housing 502 using o-rings, other polymer or metallic seal rings (e.g. as in FIG. 7 and/or otherwise), and/or other seals.

In certain instances, a thermally responsive shape change material can be used in lieu of or in combination with a phase change material. In the example expansion joint 600 depicted in FIGS. 6A-F, the annulus 620 between the tubular outer housing 602 and tubular body 604 includes a thermally responsive shape change material 646. In certain instances, the shape change material 646 is a one way shape memory metal that can be plastically deformed from an initial state, but will return to the initial state in response to application of a temperature at or above a specified temperature (referred to herein as the "actuation temperature"). In certain instances, the shape change material 646 is a two way shape memory metal that can be configured to take an initial shape at one temperature and a different shape at or above the actuation temperature. Other shape change materials are within the scope of the concepts described herein. Some examples of shape change materials include cobalt-nickel-aluminum alloys, cobalt-nickel-gallium alloys, nickel-titanium alloys, nickel-iron-gallium alloys and/or other shape change materials.

In the instant example, the shape change material 646 is configured in a helically wound strip. The shape change material 646 is configured to take a first outer diameter at or above the actuation temperature and to take a second, larger outer diameter approximately equal to the inner diameter of the annulus 620 below the actuation temperature. Thus, at temperatures below the actuation temperature the shape change material 646 abuts the inner diameter of the annulus 620 (best seen in FIG. 6B). When at a temperature at or above the actuation temperature, the shape change material 646 contracts to the first outer diameter, away from the inner diameter of the annulus 620 (best seen in FIGS. 6D and 6F).

The annulus 620 contains an interference member 648 that cooperates with the shape change material 646 to limit retraction of the expansion joint 600. In the instant example, the interference member 648 is configured as a helically wound strip with an inner diameter greater than the first outer diameter of the shape change material 646. The pitch of the helix is similar to the pitch of the helix of shape change material 646, such that the shape change material 646 and the interference member 648 nest when the shape change material 646 is at the second, larger outer diameter. Thus, when the shape change material 646 is at temperatures below the actuation temperature, it nests with the interference member 648 (best seen in FIG. 6B). When the shape change material 646 is at the actuation temperature or higher, it returns to the first outer diameter out of engagement with the interference member 648 (best seen in FIG. 6D). In the nested state, the shape change material 646 and interference member 648 form an axially rigid structure that reacts against inward facing rib 634 and outward facing rib 632 to make the expansion joint 600 rigid. When the shape change material 646 is out of engagement with the interference member 648, the shape change material 646 and interference member 648 collapse similar to a coiled spring (best seen in FIG. 6F), and allow the inner body 604 to be received into the outer body 602 and the expansion joint 600 to axially retract and thereafter extend. After having been retracted, the expansion joint 600 can be axially extended and returned to being rigid by lowering the temperature of the shape change material 646 below the actuation temperature. Other aspects and operation of expansion joint 600 are similar to the expansion joint 200 described above.

Although described with a helical shape change material 646 and interference member 648, the shape change material 646 and interference member 648 can take different forms. In another example, the shape change material 646 and interference member 648 are rings. The shape change material 646 and interference member 648 can take still other forms.

Turning now to FIGS. 7, 8A-B, and 9A-C an example sealing system 700 suited for high temperature applications is shown. The sealing system 700 incorporates a plurality of metal seal rings 702 that seal between an outer tubular 704 and an inner tubular 706. In certain instances, the seal rings 702 are not solid circular rings, but rather split (i.e., having ends). In certain instances, the seal rings 702 are C-shaped and include a gap 703 between its ends. The C-shaped seal rings 702 can be employed in sets of two or more (sets of three shown) seal rings 702 so that the gap 703 in one C-shaped seal ring 702 is overlapped by a solid portion of an adjacent seal ring 702. The gap 703 is overlapped so that, in operation, the gap 703 is covered and sealed by the adjacent seal ring 702. One or more of the seal rings 702 in a set can include a surface protrusion 708 (best seen in FIG. 8B) on a lateral surface of the seal ring 702 sized to fit in the gap 703 of an adjacent seal ring 702. When the surface protrusion 708 of a first seal ring 702 is received in the gap 703 of a second seal ring 702, the two seal rings 702 are retained relative to one another so that the opening of each ring is overlapped by the other. In an instance where there are three seal rings 702, as in FIG. 7, providing two with the surface protrusion 708 enables all three to be engaged together. In most instances, providing one fewer seal rings 702 with a surface protrusion 708 than the total number of seal rings 702 will suffice to retain the rings relative to one another. In certain instances, seal rings 702 can be configured such that one end of a given seal ring 702 overlaps its other end. The overlapping configuration of seal ring 702 has no gap.

The outer circumferential surface of the seal rings 702 seals against an interior sealing surface 710 of the outer tubular 704. In certain instances, the interior sealing surface 710 is a polished bore receptacle having a surface that has been machined, ground or otherwise formed to have a smooth surface finish. The outer diameter of seal rings 702 is slightly larger that the inner diameter of the sealing surface 710. As such, the seal rings 702 are spring biased against the outer tubular 704. The gap 703 and/or split in the seal rings 702 improves the radial resiliency of the seal rings 702. The sealing surface 710 can be long enough that as the inner tubular 706 moves axially relative to the sealing surface 710 (e.g., due to thermal expansion and contraction of the outer tubular 704 and/or inner tubular 706 and/or other relative movement of the outer tubular 704 and inner tubular 706) the seal rings 702 remain engaged and sealing to the sealing surface 710. The inner diameter of the outer tubular 704 can be ramped, smoothly stepped or otherwise reduce in diameter towards the sealing surface 710, so that the seal rings 702 reside out of contact with the outer tubular 704 until received into the sealing surface 710.

The sets of seal rings 702 are received over the inner tubular 706 and retained between pairs of shoulders 712 defined on the inner tubular 706. A spring 718 (e.g. Bellville spring, conical washer and/or other spring) can be provided between each pair of shoulders 712 to bias the seal rings 702 against one another and against one of the shoulders 712. The shoulders 712 can be integral with the inner tubular 706 (e.g., by being machined, cast, forged and/or otherwise). In certain instances, however, one or more of the shoulders 712 can be defined by shear rings 714 that are frangibly fixed to the inner tubular 706 by a shear pin or bolt 716. As described in more detail below, attaching the shear rings 714 to the inner tubular 706 with a shear pin or bolt 716 can provide a contingency to release the seal rings 702 from between the shoulders 712. In certain instances, sets of seal rings 702 can be arranged on the inner tubular 706 in pairs spaced apart by a portion 722 of the inner tubular 706 having a smaller outer diameter than the portion on which the seal rings 702 are received. As discussed in more detail below, the portion 722 of smaller diameter on the inner tubular 706 facilitates contingency release of the seal rings 702. FIG. 9A depicts an embodiment with four sets of seal rings 702. Fewer or more sets of seal rings 702 can be provided. Providing multiple sets of seal rings 702 provides sealing redundancy.

In operation, as depicted in FIGS. 9A and 9B, the inner tubular 706 carrying the seal rings 702 is inserted into the outer tubular 704 such that the seal rings 702 land and seal on the sealing surface 710. Unlike many metal seal systems, the seal rings 702 need not plastically deform to seal between the inner tubular 706 and outer tubular 704. The inner tubular 706 may carry a guard member 720 (e.g., a collet, spring centralizer and/or other device) that precedes and protects the seal rings 702 as they enter the sealing surface 710. In certain instances, sets or multiple sets of seal rings 702 are bounded by guard members 720 and the guard members 720 operate to centralize the inner tubular 706 in the outer tubular 704. FIG. 9A shows four sets of seal rings 702 axially bounded by guard members 720. In other instances, fewer or more guard members 720 can be provided or the guard members 720 can be omitted.

Figure 9C:
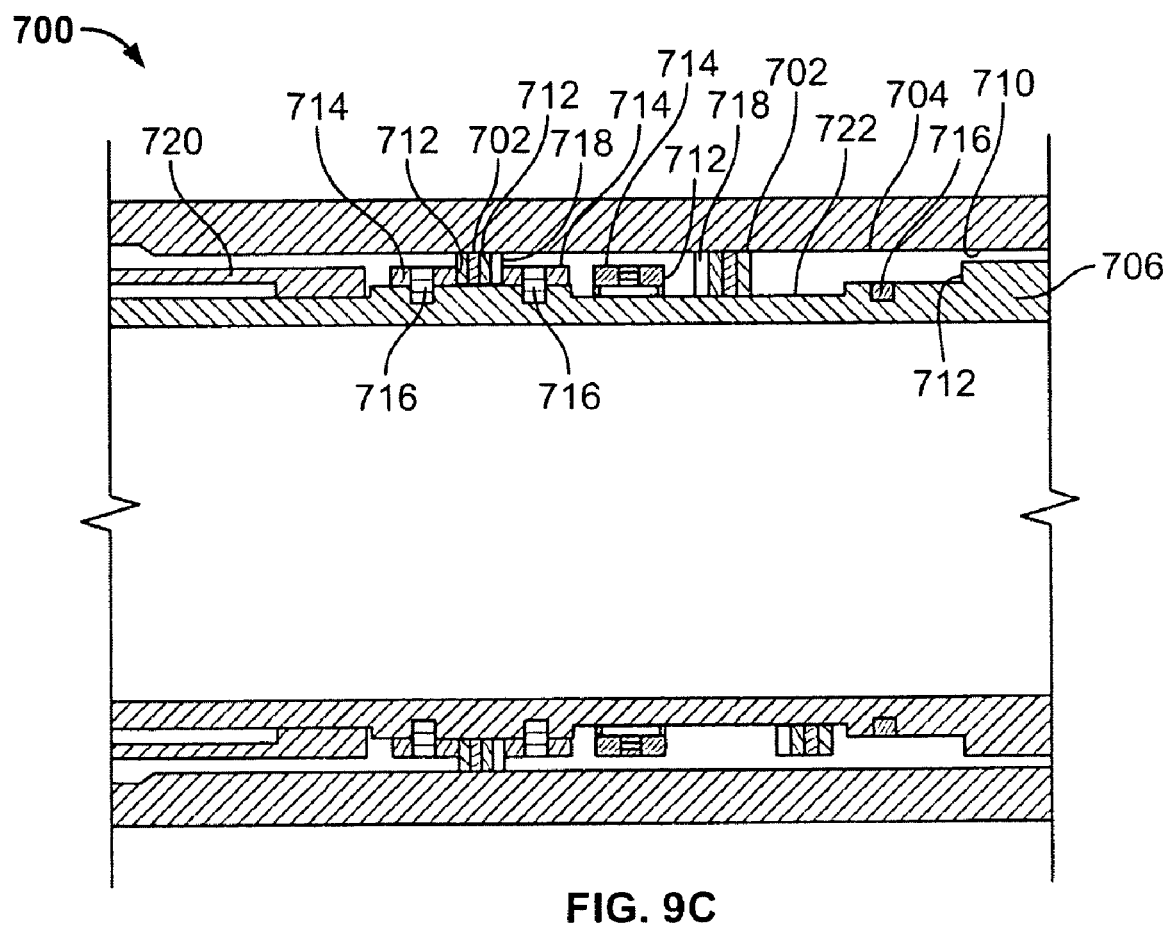

As seen in FIG. 9C, one or more sets of the seal rings 702 can be released from between shoulders 712 by releasing an adjacent shear ring 714 (e.g., by shearing the shear pin or bolt 716). Releasing sets of seal rings 702 from between shoulders 712 can provide a contingency to address situations where one or more of the seal rings 702 cannot pass freely through the outer tubular 704. For example, if a seal ring 702 encounters debris or otherwise adheres to or cannot pass the outer tubular 704, continued movement and/or impact loading (e.g., jarring) the inner tubular 706 can cause a shear ring 714 adjacent the affected set of seal rings 702 to release from the inner tubular 706. The shear ring 714 and seal rings 702 can then move into the portion 722 of smaller diameter. In the portion 722 of smaller diameter, the seal rings 702 have additional room in which to cock (as depicted in FIG. 9C) and facilitate passing debris or releasing from the outer tubular 704.

Although depicted with the sealing rings 702 and shoulders 712 carried on the inner tubular 706, in certain instances, the sealing rings 702 and shoulders 712 (including shear rings 714 and other associated details of sealing system 700) can be carried on the interior of the outer tubular 704. As such, the inner tubular 706 would include a seal surface (similar to sealing surface 710) on its outer diameter and the sealing rings 702 can be springingly biased into sealing contact with the sealing surface of the inner tubular 706.

The sealing system 700 can be employed in a number of sealing applications about example system 100 described above (FIG. 1). In certain instances, the sealing system 700 can be employed in an expansion joint, such as those described with respect to FIGS. 2A-5. For example, the sealing system 700 can be employed to seal between an outer housing and inner body of an expansion joint. By way of example in the expansion joint 200 of FIGS. 2A-B, the sealing system 700 can be employed at an end of the annulus 220, where the outer tubular 704 is the outer housing 202 and the inner tubing 706 is the inner body 204. The sealing system 700 can be applied in a similar manner to the expansion joints 300-500 (FIGS. 3-5). The sealing system 700 can additionally or alternatively be employed to seal other aspects of expansion joints 200-500.

In certain instances, the sealing system 700 can be employed as seals 144 (FIG. 1) to seal between the treatment fluid injection string 156 and the first leg 138 of the junction liner device 124. As such, the outer tubular 704 is the first leg 138 and the inner tubular 706 is the injection string 156. Similarly, the sealing system 700 can be employed to seal between the treatment fluid injection string 156 and the injection liner 118 at each of the flow distribution valves 152, where the outer tubular 704 is the injection liner 118 and the inner tubular is the injection string 156. The sealing system 700 can be employed at other locations about system 100, including in seal assembly 128 sealing between the junction liner device 124 and casing 158, in sealing leg 136 of junction 132 to polished bore receptacle 130, in seal assembly 168 sealing space out tubing 166 to production liner 170, and/or at other locations around system 100.

The sealing system 700 is a simple system, and economical to construct. Moreover, because it employs metal seal rings, it can withstand service temperatures associated with heated fluid injection. In operation, certain embodiments of the sealing system 700 can maintain sealing against flows of fluids having temperatures of 250° C. and above and, in some instances, 400° C. and above. The seal rings 702 need not make a substantially gas and/or liquid tight seal. Rather the sealing achieved by the seal rings 702 can be to substantially block flow while allowing some leakage. The sealing system 700 can be used in a wide array of applications, including waterflood, steam flood, and high volume wells where screen cutting due to annular flow is a concern.

A number of examples have been described. Nevertheless, it will be understood that various modifications may be made. Accordingly, other embodiments are within the scope of the following claims.

What is claimed is:

1. A wellbore device, comprising:
    a first elongate tubular body adapted to reside in a wellbore; and
    a second elongate tubular body coupled to the first elongate tubular body and adapted to reside in the wellbore;
    the wellbore device changeable between the first elongate tubular body axially fixed against movement in a first direction relative to the second elongate tubular body and axially moveable in the first direction relative to the second elongate tubular body in response to temperature above a specified temperature; and
    a phase change material that is solid below the specified temperature and flowable above the specified temperature, the phase change material residing about the second elongate tubular body and, when solid, axially fixing the first elongate tubular body against movement in the first direction relative to the second elongate tubular body, wherein the phase change material resides in an annulus defined between the first elongate tubular body and the second elongate tubular body; and the first elongate tubular body is sealed to the second elongate tubular body with two or more split metal seal rings arranged so that a gap in one seal ring is overlapped by an adjacent seal ring.

2. The wellbore device of claim 1, wherein the phase change material grips a profile defined by the first and second elongate tubular bodies when solid.

3. The wellbore device of claim 1, wherein the specified temperature is less than 200° C.

4. A downhole tool system, comprising:
a downhole tool including:
  a first tubing;
  a second tubing, the first and second tubings concentrically arranged;
  wherein the first tubing is a housing of an expansion joint and the second tubing is a body of the expansion joint;
  a first metallic split seal ring carried on the second tubing and sealed to the second tubing, the first seal ring springingly biased to sealing contact against the first tubing; and
  a second metallic split seal ring carried on the second tubing and abutting the first seal ring, the second seal ring springing biased in sealing contact against the first tubing, the first and second seal rings arranged with a split in the first seal ring is overlapped by the second seal ring; and
a phase change material residing between the housing and body, the phase change material being solid below a specified temperature and flowable above the specified temperature, the phase change material, when solid, gripping the housing and the body and axially fixing the body relative to the housing.

5. The downhole tool system of claim 4, wherein the first seal ring is C-shaped having a gap between ends of the seal ring.

6. The downhole tool system of claim 5, wherein the second seal ring has a protrusion on a lateral surface thereof configured to fit in the gap of the first seal ring and retain the first seal ring relative to the second seal ring so that the gap of the first seal ring is overlapped by the second seal ring.

7. The downhole tool system of claim 4, further comprising:
a hydraulic volume about the body;
the phase change material sealing the hydraulic volume when the phase change material is solid and not sealing the hydraulic volume when the phase change material is flowable; and
a fluid in the hydraulic volume that, when sealed in the hydraulic volume, axially fixes the body against movement in a first direction relative to the housing.

8. The downhole tool system of claim 4, wherein the first tubing is coupled to a permeable liner and the second tubing is a heated fluid injection string.

9. The downhole tool system of claim 4, wherein the first and second seal rings are retained against a shear ring frangibly affixed to the second tubing.

10. The downhole tool system of claim 4, wherein the first and second seal rings maintain sealing at 250° C. and greater.

11. The downhole tool system of claim 4, wherein the first and second seal rings are not substantially plastically deformed in sealing.

12. The downhole tool system of claim 4, further comprising a spring carried on the second tubing and biasing the first seal ring to abut the second seal ring.

* * * * *